(12) United States Patent
Guan et al.

(10) Patent No.: US 11,204,798 B2
(45) Date of Patent: Dec. 21, 2021

(54) APPARATUS AND METHOD FOR VIRTUAL MACHINE SCHEDULING IN NON-UNIFORM MEMORY ACCESS ARCHITECTURE

(71) Applicant: SHANGHAI JIAO TONG UNIVERSITY, Shanghai (CN)

(72) Inventors: Haibing Guan, Shanghai (CN); Ruhui Ma, Shanghai (CN); Jian Li, Shanghai (CN); Zhengwei Qi, Shanghai (CN); Junsheng Tan, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 192 days.

(21) Appl. No.: 16/466,184

(22) PCT Filed: Oct. 18, 2017

(86) PCT No.: PCT/CN2017/106748
§ 371 (c)(1),
(2) Date: Jun. 3, 2019

(87) PCT Pub. No.: WO2018/196296
PCT Pub. Date: Nov. 1, 2018

(65) Prior Publication Data
US 2020/0073703 A1 Mar. 5, 2020

(30) Foreign Application Priority Data
Apr. 24, 2017 (CN) .......................... 201710272053.2

(51) Int. Cl.
*G06F 9/455* (2018.01)
*G06F 9/48* (2006.01)
*G06F 12/02* (2006.01)

(52) U.S. Cl.
CPC ........ *G06F 9/4856* (2013.01); *G06F 9/45558* (2013.01); *G06F 12/023* (2013.01);
(Continued)

(58) Field of Classification Search
None
See application file for complete search history.

(56) References Cited

U.S. PATENT DOCUMENTS 8,701,115 B2 * 4/2014 Bhandari ............ G06F 9/45558
718/102
8,990,335 B2 * 3/2015 Fauser .................. G06F 16/183
709/215

(Continued)

FOREIGN PATENT DOCUMENTS

CN 106293881 A 1/2017
CN 106293944 A 1/2017
(Continued)

OTHER PUBLICATIONS

Rao et al "Optimizing Virtual Machine Scheduling in NUMA Multicore Systems", 2013 IEEE, 12 pages.*
(Continued)

*Primary Examiner* — Van H Nguyen
(74) *Attorney, Agent, or Firm* — Blank Rome LLP

(57) ABSTRACT

The method includes the following steps: step 1. obtaining NUMA topology information of a host machine, and monitoring virtual machine performance events by using a kernel PMU; step 2. implementing a greedy algorithm, and a scheduling decision is obtained; step 3. scheduling, according to the scheduling decision, a virtual CPU (VCPU) and a memory of a virtual machine; step 4. after the scheduling of the virtual machine is complete, redirecting to step 1 to continue performing performance monitoring of the virtual machine.

4 Claims, 3 Drawing Sheets

(52) U.S. Cl.
CPC .. *G06F 12/0284* (2013.01); *G06F 2009/4557* (2013.01); *G06F 2009/45579* (2013.01); *G06F 2009/45583* (2013.01); *G06F 2009/45591* (2013.01); *G06F 2212/2542* (2013.01)

(56) References Cited

U.S. PATENT DOCUMENTS

| | | | | |
|---|---|---|---|---|
| 9,465,669 | B2* | 10/2016 | Venkatasubramanian | G06F 9/5033 |
| 9,535,767 | B2* | 1/2017 | Oshins | G06F 3/0631 |
| 9,800,523 | B2* | 10/2017 | Guan | H04L 49/9068 |
| 10,255,091 | B2* | 4/2019 | Kim | G06F 9/45554 |
| 2009/0077550 | A1* | 3/2009 | Rhine | G06F 9/45558 718/1 |
| 2012/0197868 | A1* | 8/2012 | Fauser | G06F 16/2471 707/714 |
| 2013/0268933 | A1* | 10/2013 | Bhandari | G06F 9/455 718/1 |
| 2016/0085571 | A1* | 3/2016 | Kim | G06F 9/48 718/1 |

FOREIGN PATENT DOCUMENTS

| | | |
|---|---|---|
| CN | 106354543 A | 1/2017 |
| CN | 107168771 A | 9/2017 |

OTHER PUBLICATIONS

Wu et al "vProbe: Scheduling Virtual Machines on NUMA Systems", 2016 IEEE, pp. 70-79.*

Luo et al "Optimizing the Memory Management of a Virtual Machine Monitor on a NUMA System", 2012 IEEE, pp. 66-74.*

Decision of Rejection from Chinese Patent Application No. 201710272053.2 dated Aug. 13, 2020.

Yuanyuan Zhou, Performance profiling method and tool based on PMU for NUMA platform on VM environment (Master Dissertation), May 8, 2015.

* cited by examiner

APPARATUS AND METHOD FOR VIRTUAL MACHINE SCHEDULING IN NON-UNIFORM MEMORY ACCESS ARCHITECTURE

FIELD OF THE INVENTION

The present invention relates to the field of computer virtualization technologies, and in particular, to an apparatus and a method for virtual machine scheduling in a non-uniform memory access architecture.

DESCRIPTION OF THE PRIOR ART

Virtualization is one of key technologies of cloud computing. The virtualization technology can virtualize a physical computer system into one or more virtual computer systems. Each virtual computer system (client or virtual machine for short) has its own virtual hardware (for example, a CPU, a memory, and a device), to provide an independent virtual machine execution environment. The real physical computer system running the virtual machine becomes a host machine. Because the virtualization technology has a fault tolerance and a high resource utilization rate, the virtualization technology is widely applied to fields such as cloud computing and high-performance computing. Currently, relatively representative cloud computing providers include Alibaba Cloud Computing, Amazon Web Services, and the like.

In the virtualization environment, a virtual machine monitor (VMM) is a software management layer between the hardware and an operating system. The VMM is mainly responsible for managing real physical resources such as the CPU, the memory, and an I/O device, and abstracting a bottom-layer hardware resource as a corresponding virtual device interface to be used by the virtual machine.

Meanwhile, a non-uniform memory access (NUMA) architecture has been a dominant architecture of modern servers due to the scalability of the NUMA architecture. As shown in FIG. 1, a basic feature of the NUMA architecture is having multiple CPU modules. Each CPU module includes multiple CPU cores (for example, 8 cores), and has an independent local memory, an I/O socket, and so on. Because nodes of the NUMA architecture are connected to and exchange information with each other by using an interconnection module (for example, Quick Path Interconnect of Intel), each CPU can access a memory of an entire system. Apparently, a speed for accessing a local memory is far higher than a speed for accessing a remote memory (a memory of another node in the system). The NUMA architecture brings about an obvious challenge to performance optimization of the virtual machine, because an NUMA topology architecture of the host machine is usually transparent and invisible for the virtual machine.

Now, basically a method used by all VMMs, including Xen, KVM, and VMware ESXi, is that best efforts are made to schedule a virtual CPU (VCPU) and all memories of one virtual machine to one node, to maintain local access. However, the method has a serious disadvantage. Because a load balance technology and other technologies of the system can dynamically balance load between the CPU and the memories, an original placement strategy is interfered, and finally the strategy fails. Therefore, in the NUMA architecture, how to perform scheduling optimization on a VCPU and a memory of a virtual machine becomes a hot research field now.

However, when a researcher researches an NUMA scheduling optimization algorithm, in addition to implementing the algorithm, the researcher also needs to consider details, for example, how to collect virtual machine performance information, system NUMA topology information, and the like on a particular platform system, and scheduling of a VCPU and a memory of a virtual machine. In addition, when the NUMA scheduling optimization algorithm is implemented, different VMMs, for example, differences between an XEN interface and a KVM interface, also need to be considered. This is a significant burden for research on the NUMA scheduling optimization algorithm, and seriously affects the efficiency of researching the NUMA scheduling optimization algorithm by the researcher.

Therefore, a person skilled in the art is committed to developing an apparatus and a method for virtual machine scheduling in an NUMA architecture. In the NUMA architecture, by using an apparatus for virtual machine scheduling in the NUMA architecture of the present invention, a researcher needs only to focus on implementation of the NUMA scheduling optimization algorithm, and does not need to consider details, for example, collection of data such as information and performance of a virtual machine, and specific scheduling of the virtual machine, thereby greatly improving the research efficiency of the researcher.

SUMMARY OF THE INVENTION

In view of the foregoing disadvantages in the art, the technical objective of the present invention is to develop an apparatus and a method for virtual machine scheduling in an NUMA architecture. In the NUMA architecture, by using an apparatus for virtual machine scheduling in the NUMA architecture of the present invention, a researcher needs only to focus on implementation of the NUMA scheduling optimization algorithm, and does not need to consider details, for example, collection of data such as information and performance of a virtual machine, and specific scheduling of the virtual machine, thereby greatly improving the research efficiency of the researcher. To realize the foregoing objective, the present invention provides an apparatus for virtual machine scheduling in an NUMA architecture, including a performance monitoring module, an algorithm implementation interface module, and a virtual machine scheduling module, where the performance monitoring module is configured to monitor particular performance events by using a performance monitoring unit (PMU) of an operating system kernel; the algorithm implementation interface module is configured to be implemented by exposing a virtual machine scheduling function interface to a researcher, and transmit information of the performance monitoring module to an algorithm implementer, where the algorithm implementer returns a scheduling decision by using a function; and the virtual machine scheduling module is configured to perform corresponding scheduling on a VCPU and a memory of a virtual machine according to the scheduling decision returned by the algorithm implementation interface module. Further, the performance events monitored by the performance monitoring module include CPU usage, memory usage, a cache loss ratio, and I/O performance data of the virtual machine.

The present invention further provides a method for virtual machine scheduling in an NUMA architecture, including the following steps:

step 1. obtaining, by the performance monitoring module, NUMA topology information of a host machine, and monitoring virtual machine performance events by using a kernel PMU;

step 2. transmitting the NUMA topology information of the host machine and the virtual machine performance events to the algorithm implementation interface module;

step 3. invoking, by the algorithm implementation interface module, an algorithm, and transmitting a scheduling decision that is obtained by using a scheduling algorithm to the virtual machine scheduling module after execution of the scheduling algorithm is complete;

step 4. scheduling, by the virtual machine scheduling module according to the scheduling decision transmitted by the algorithm implementation interface module, a virtual CPU (VCPU) and a memory of a virtual machine; and step 5. after the scheduling of the virtual machine is complete, redirecting to step 1 to continue performing performance monitoring of the virtual machine.

Further, the scheduling algorithm includes a greedy algorithm.

Further, the NUMA topology information of the host machine NUMA includes a quantity of NUMA nodes, a distance between the NUMA nodes, and an NUMA node to which an I/O device is connected.

Further, the step 1 specifically includes real-time monitoring of performance events, such as CPU usage, memory usage, and I/O usage, of the virtual machine by using a virtual machine monitor (VMM), real-time monitoring of performance events, such as a cache loss ratio of an operating system and cycles per second of executing instructions by the virtual machine, by using the PMU of an operating system kernel, and obtaining a topology structure of an NUMA architecture of the host machine.

The present invention has the following technical effects:
(1) The affinity of a node between the I/O device and a processor is considered, and one dimension is added to a conventional modeling method, so that the system can reflect importance of the I/O device in a current high-performance I/O environment.
(2) The virtual machine performance events are monitored by using the kernel PMU, greatly reducing the overhead of performance monitoring of the virtual machine.
(3) The apparatus for virtual machine scheduling is divided into three modules, reducing the coupling degree between the modules. Each module can be separately designed and developed, improving the research and development efficiency of the researcher.

The concept, specific structure, and generated technical effects of the present invention will be further described below with reference to the accompanying drawings, so that the objective, features, and effects of the present invention are fully understood.

DETAILED DESCRIPTION OF THE PREFERRED EMBODIMENTS

Figure 1:
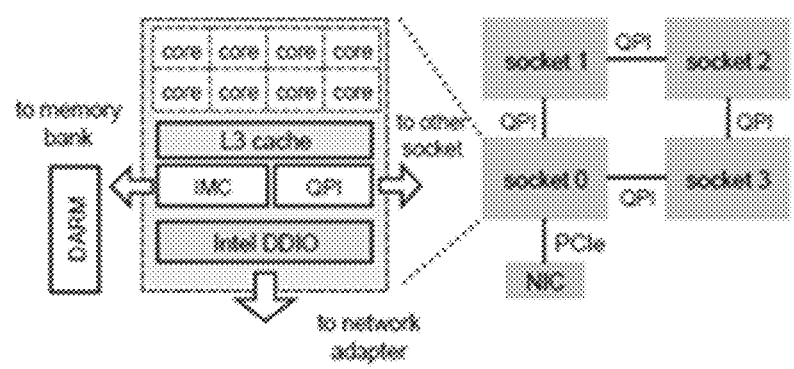
FIG. 1 is a schematic diagram of a non-uniform memory access (NUMA) architecture in prior art.
Figure 2:
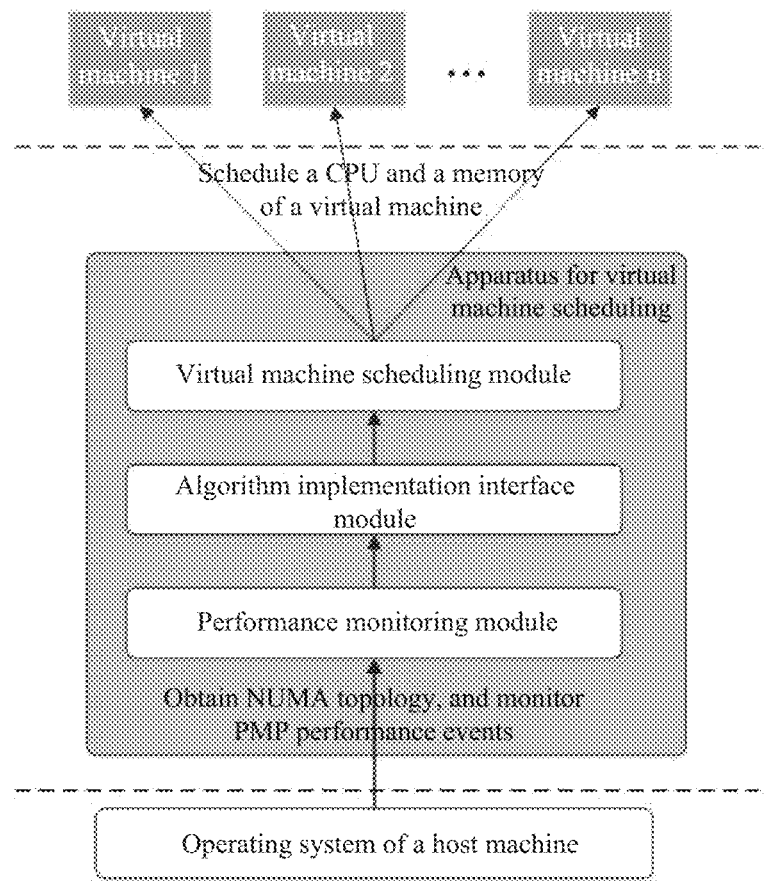
FIG. 2 is a schematic diagram of a system architecture of an apparatus for virtual machine scheduling in an NUMA architecture according to a preferred embodiment of the present invention.

As shown in FIG. 2, a preferred embodiment of the present invention provides an apparatus for virtual machine scheduling in an NUMA architecture, including a performance monitoring module, an algorithm implementation interface module, and a virtual machine scheduling module, where the performance monitoring module is configured to monitor particular performance events by using a PMU of an operating system kernel; the algorithm implementation interface module is configured to be implemented by exposing a virtual machine scheduling function interface to a researcher, and transmit information of the performance monitoring module to an algorithm implementer, where the algorithm implementer returns a scheduling decision by using a function; and the virtual machine scheduling module is configured to perform corresponding scheduling on a VCPU and a memory of a virtual machine according to the scheduling decision returned by the algorithm implementation interface module.

The performance events monitored by the performance monitoring module include CPU usage, memory usage, a cache loss ratio, and I/O performance data of the virtual machine.

Figure 3:
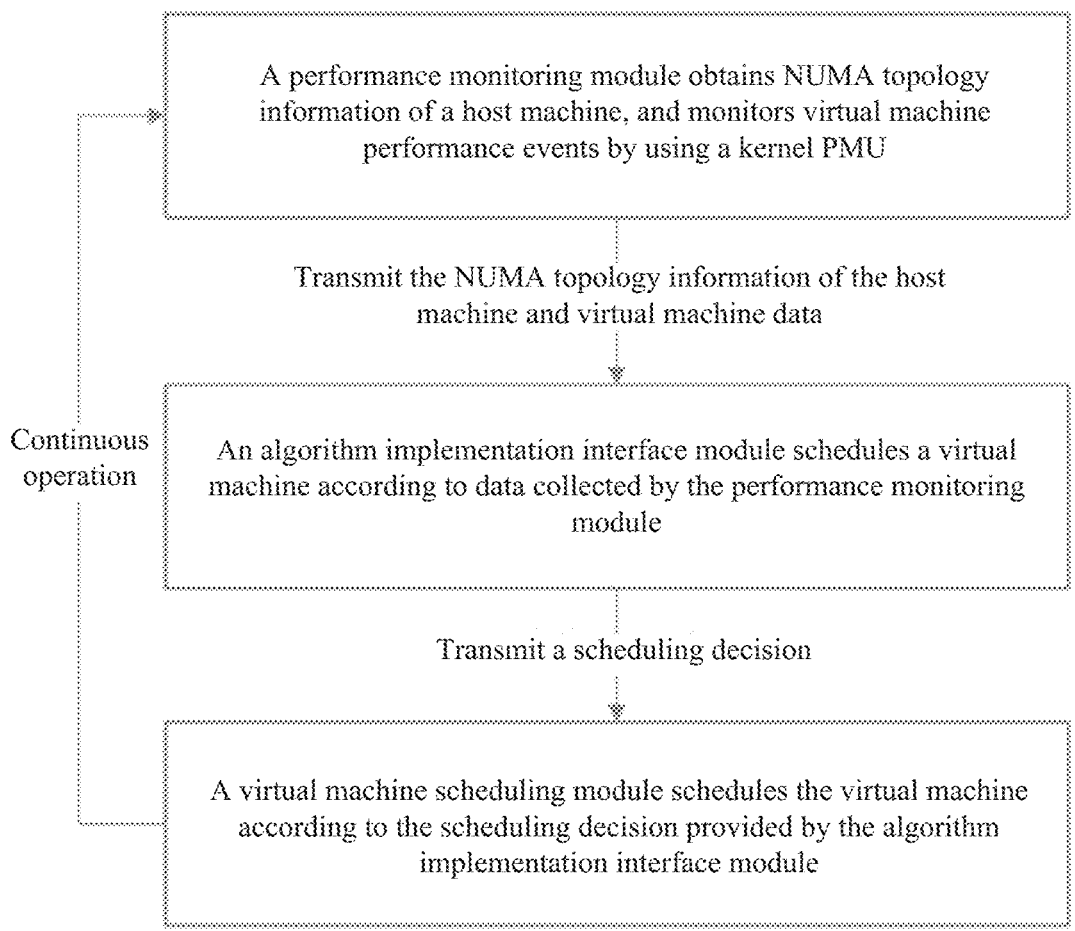
FIG. 3 is a schematic flowchart of a method for virtual machine scheduling in an NUMA architecture according to a preferred embodiment of the present invention.

As shown in FIG. 3, a preferred embodiment of the present invention provides a method for virtual machine scheduling in an NUMA architecture, including the following steps:

Step 1. A performance monitoring module obtains NUMA topology information of a host machine, and monitors virtual machine performance events by using a kernel PMU.

Step 2. Transmit the NUMA topology information of the host machine and the virtual machine performance events to an algorithm implementation interface module, where the NUMA topology information of the host machine NUMA includes a quantity of NUMA nodes, a distance between the NUMA nodes, and an NUMA node to which an I/O device is connected.

Step 3. The algorithm implementation interface module invokes an algorithm, and transmits a scheduling decision that is obtained by using a scheduling algorithm to a virtual machine scheduling module after execution of the scheduling algorithm is complete.

Step 4. The virtual machine scheduling module schedules a VCPU and a memory of a virtual machine according to the scheduling decision transmitted by the algorithm implementation interface module.

Step 5. After the scheduling of the virtual machine is complete, redirect to step 1 to continue performing performance monitoring of the virtual machine.

The scheduling algorithm is a greedy algorithm. An algorithm process of the scheduling algorithm includes the following steps:

(1) Input of the algorithm is the NUMA topology information of the host machine and the virtual machine performance events that are transmitted by the performance monitoring module.

(2) Whether the virtual machine is an I/O-intensive virtual machine by using the following formula:

$$\text{if PacketsPerSecond}_{VM} > \text{threshold}$$

where $\text{PacketsPerSecond}_{VM}$ is a quantity of network data packets received and transmitted by the virtual machine, the quantity is obtained by the performance monitoring module by means of monitoring, and threshold is a predefined threshold.

(3) If it is determined that the virtual machine is an I/O-intensive virtual machine by using the formula, an NUMA node to which the virtual machine shall be scheduled is further determined by using the following formula:

$$\text{MAX}(\Sigma_{n=0}^{N} \text{Mem}[n] * ANM\text{Matrix}(n))$$

where n represents an NUMA node; N represents a quantity of NUMA nodes provided by the performance monitoring module; Mem[n] represents a quantity of memory pages that are distributed at the NUMA node n by the virtual machine, and the quantity is provided by the performance monitoring module; and ANMMatrix(n) represents a distance between the NUMA nodes provided by the performance monitoring module. For N NUMA nodes, the algorithm selects a node with the maximum value that is obtained by using the foregoing formula, and schedules the virtual machine to the node.

(4) If the virtual machine is not an I/O-intensive virtual machine, an NUMA node to which the virtual machine shall be scheduled is determined by using the following formula:

$$\text{Max}(\Sigma_{c=0}^{N}\Sigma_{n=0}^{N}\text{CPU}[c]*\text{Mem}[n]*ANM\text{Matrix}(n))$$

where N represents a quantity of NUMA nodes of the host machine, CPU[c] represents CPU usage of the virtual machine at a node c, Mem[n] represents a quantity of memory pages that are distributed at an NUMA node n by the virtual machine, and ANMMatrix(n) represents a distance between the NUMA nodes provided by the performance monitoring module. For N NUMA nodes, the algorithm calculates a value of each node by using the foregoing formula, then selects a node with the maximum value, and schedules the virtual machine to the node.

(5) The algorithm returns the scheduling decision of the virtual machine according to the foregoing process.

The step 1 specifically includes real-time monitoring of performance events, such as CPU usage, memory usage, and I/O usage, of the virtual machine by using a virtual machine monitor (VMM), real-time monitoring of performance events, such as a cache loss ratio of an operating system and cycles per second of executing instructions by the virtual machine, by using the PMU of an operating system kernel, and obtaining the topology information of an NUMA architecture of the host machine. The specific preferred embodiments of the present invention are described in detail above. It should be understood that, a person of ordinary skill in the art may make multiple modifications and variations according to the concept of the present invention without creative efforts. Therefore, a technical solution that is obtained by a person skilled in the art by means of logic analysis or reasoning or by performing limited tests based on the prior art and according to the concept of the present invention shall fall within the protection scope of the claims.

The invention claimed is:

1. A method for virtual machine scheduling, the method comprising at least the following steps:
    step 1. obtaining, a non-uniform memory access (NUMA) topology information of a host machine, and monitoring performance events of a virtual machine by using a kernel performance monitoring unit (PMU);
    step 2. implementing a greedy algorithm to obtain a scheduling decision;
    step 3. scheduling, according to the scheduling decision, a virtual CPU (VCPU) and a memory of the virtual machine; and
    step 4. after the scheduling of the virtual machine is complete, redirecting to step 1 to continue performing performance monitoring of the virtual machine;
    wherein the greedy algorithm includes at least the following steps:
        inputting the NUMA topology information of the host machine and the performance events of the virtual machine;
        determining whether the virtual machine is an I/O-intensive virtual machine;
        determining an NUMA node to which the virtual machine shall be scheduled; and
        returning the scheduling decision; and
    wherein the step 1 comprises at least the following steps:
        real-time monitoring the performance events of the virtual machine, by using a virtual machine monitor (VMM);
        real-time monitoring performance events of an operating system, by using the PMU of an operating system kernel; and
        obtaining a topology structure of a NUMA architecture of the host machine;
    wherein the performance events of the virtual machine comprise a CPU usage, a memory usage, and an I/O usage of the virtual machine, and the performance events of the operating system comprise a cache loss ratio of the operating system and cycles per second of executing instructions by the virtual machine.

2. The method for virtual machine scheduling according to claim 1, wherein the NUMA topology information of the host machine NUMA comprises a quantity of NUMA nodes, a distance between the NUMA nodes, and an NUMA node to which an I/O device is connected.

3. The method for virtual machine scheduling according to claim 1, wherein if it is determined that the virtual machine is an I/O-intensive virtual machine, the NUMA node to which the virtual machine shall be scheduled is further determined by using the following formula:

$$\text{MAX}(\Sigma_{n=0}^{N}\text{Mem}[n]*ANM\text{Matrix}(n))$$

where n represents the NUMA node; N represents a quantity of NUMA nodes; Mem[n] represents a quantity of memory pages that are distributed at the NUMA node n by the virtual machine; and ANMMatrix(n) represents a distance between the NUMA nodes.

4. The method for virtual machine scheduling according to claim 3, wherein if the virtual machine is not an I/O-intensive virtual machine, the NUMA node to which the virtual machine shall be scheduled is determined by using the following formula:

$$\text{Max}(\Sigma_{c=0}^{N}\Sigma_{n=0}^{N}\text{CPU}[c]*\text{Mem}[n]*ANM\text{Matrix}(n))$$

where CPU[c] represents CPU usage of the virtual machine at a node c.

* * * * *